(12) United States Patent
Chanda et al.

(10) Patent No.: US 11,841,786 B2
(45) Date of Patent: *Dec. 12, 2023

(54) PREDICTIVE ANOMALY DETECTION FRAMEWORK

(71) Applicant: Visa International Service Association, San Francisco, CA (US)

(72) Inventors: Raghuveer Chanda, Bengaluru (IN); Himanshu Ojha, Lucknow (IN); Abdul Hadi Shakir, Bangalore (IN); Subash Prabanantham, Bengaluru (IN); Vipul Valamjee, Bengaluru (IN)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/556,792

(22) Filed: Dec. 20, 2021

(65) Prior Publication Data

US 2022/0114074 A1 Apr. 14, 2022

Related U.S. Application Data

(63) Continuation of application No. 16/489,300, filed as application No. PCT/US2017/020246 on Mar. 1, 2017, now Pat. No. 11,237,939.

(51) Int. Cl.
*G06F 11/00* (2006.01)
*G06F 11/34* (2006.01)
(Continued)

(52) U.S. Cl.
CPC ...... *G06F 11/3447* (2013.01); *G06F 11/0751* (2013.01); *G06F 11/3075* (2013.01); *G06F 11/3452* (2013.01)

(58) Field of Classification Search
CPC ............ G06F 11/0751; G06F 11/3075; G06F 11/3447; G06F 11/3452; G06N 20/20
See application file for complete search history.

(56) References Cited

U.S. PATENT DOCUMENTS 7,310,590 B1 12/2007 Bansal
7,346,471 B2 3/2008 Chickering et al.
(Continued)

OTHER PUBLICATIONS

U.S. Appl. No. 16/489,300, First Action Interview Office Action Summary, dated Jun. 1, 2021, 5 pages.
(Continued)

*Primary Examiner* — Elmira Mehrmanesh
(74) *Attorney, Agent, or Firm* — Kilpatrick Townsend & Stockton LLP

(57) ABSTRACT

Embodiments of the invention are directed to techniques for detecting anomalous values in data streams using forecasting models. In some embodiments, a computer can receive a value of a data stream comprising a plurality of data values, where the received value corresponds to a time interval and previously received values each correspond to a previous time interval. Models can be selected based on the time interval, where each of the models has a different periodicity. For each of the selected models, the computer may generate a score by generating a prediction value based on the model and generating the score based on the prediction value and the received value. A final score can then be generated based on the scores. Next, a score threshold can be generated. If the final score exceeds the score threshold, the computer may generate a notification that indicates that the data value is an anomaly.

16 Claims, 7 Drawing Sheets

(51) Int. Cl.
*G06F 11/07* (2006.01)
*G06F 11/30* (2006.01)

(56) References Cited

U.S. PATENT DOCUMENTS

| | | | |
|---|---|---|---|
| 7,792,770 | B1 | 9/2010 | Phoha et al. |
| 9,300,684 | B2 | 3/2016 | Luiset et al. |
| 9,727,533 | B2 | 8/2017 | Thibaux |
| 9,772,896 | B2 | 9/2017 | Caffrey |
| 10,061,677 | B2 | 8/2018 | Toledano |
| 10,102,056 | B1 | 10/2018 | Goldberg |
| 10,263,833 | B2 | 4/2019 | Maheshwari et al. |
| 10,402,244 | B2 | 9/2019 | Neuvirth-Telem et al. |
| 10,409,665 | B2 | 9/2019 | Steiner et al. |
| 10,459,827 | B1 | 10/2019 | Aghdaie et al. |
| 10,467,087 | B2 | 11/2019 | Zarrini et al. |
| 10,592,666 | B2 | 3/2020 | Kim et al. |
| 10,635,565 | B2 | 4/2020 | Dang et al. |
| 10,776,231 | B2 | 9/2020 | Buda et al. |
| 10,917,419 | B2 | 2/2021 | Crotinger et al. |
| 11,237,939 | B2 * | 2/2022 | Chanda ............... G06F 11/3452 |
| 2010/0027432 | A1 | 2/2010 | Gopalan et al. |
| 2011/0119100 | A1 | 5/2011 | Ruhl et al. |
| 2014/0006330 | A1 | 1/2014 | Biem |
| 2015/0381648 | A1 | 12/2015 | Mathis |
| 2016/0088006 | A1 | 3/2016 | Gupta et al. |
| 2016/0147583 | A1 | 5/2016 | Ben Simhon et al. |
| 2016/0253598 | A1 | 9/2016 | Yamada et al. |
| 2016/0285700 | A1 | 9/2016 | Gopalakrishnan et al. |
| 2018/0275642 | A1 | 9/2018 | Tajima et al. |

OTHER PUBLICATIONS

U.S. Appl. No. 16/489,300 , First Action Interview Pilot Program Pre-Interview Communication, dated Mar. 23, 2021, 6 pages.
U.S. Appl. No. 16/489,300 , Notice of Allowance, dated Sep. 22, 2021, 6 pages.
Application No. EP17898369.8 , Extended European Search Report, dated Mar. 6, 2020, 11 pages.
Application No. EP17898369.8 , Notice of Decision to Grant, dated Sep. 9, 2021, 2 pages.
Application No. PCT/US2017/020246 , International Preliminary Report on Patentability, dated Sep. 12, 2019, 10 pages.
Application No. PCT/US2017/020246 , International Search Report and Written Opinion, dated Nov. 28, 2017, 13 pages.

* cited by examiner

PREDICTIVE ANOMALY DETECTION FRAMEWORK

This patent application is a Continuation of U.S. patent application Ser. No. 16/489,300 filed Aug. 27, 2019, now U.S. Pat. No. 11,237,939 issued on Feb. 1, 2022 which claims priority to PCT Application No. PCT/US2017/020246, with an international filing date of Mar. 1, 2017, both of which are herein incorporated by reference in their entirety for all purposes.

BACKGROUND

When a large amount of data that is gathered from multiple heterogeneous data sources is exposed to a sizable number of extract, load, transform (ETL) processes, there may be an increase in the probability of anomalies (i.e., errors) appearing in the data. To safeguard the data's integrity, it may be desirable to detect such anomalies in the data and take actions to address the detected anomalies. In many cases, data may be received in the form of a time series, where discrete data values are periodically received over time. In such cases, when a data value that deviates significantly from past data values (e.g., the data value is many times greater than past data values) is received, the deviation may either be (1) due to one or more problems that needs to be addressed (e.g., a database failure) or (2) due to one or more internal/external factors that do not need to be addressed (e.g., a holiday event causing increased/decreased usage of transportation or electronic resources). However, it may be time consuming and/or resource intensive to determine whether the former case is true or the latter case is true.

For instance, a monitoring service for a popular website may receive a total number of visits per hour every hour from servers stationed at geographically dispersed co-locations. If one of the co-locations happens to report an hourly visit total that is many times smaller than previously reported totals, it may be difficult to tell whether the low visitor count is due to a server malfunction or an external event (e.g., a natural disaster) without performing a detailed investigation.

Embodiments of the present invention address these problems and other problems individually and collectively.

BRIEF SUMMARY

Embodiments of the invention are directed to data monitoring. More specifically, embodiments of the invention are directed to techniques for detecting anomalous values in data streams using forecasting models.

For example, an organization can run an server computer that provides a service (i.e., a monitoring service). The monitoring service can periodically receive, as input, data values from a data stream. The data stream can comprise data values that are periodically provided by one or more client computers configured to be monitored by the monitoring service. Alternatively, the data stream can comprise data values that are being extracted and/or loaded from one or more data stores, data archives, and/or data files.

In some cases, the data values can correspond to one or more metrics that represent the client computers' operational status (e.g., the number of visits to a webpage per hour, the average hard drive temperature over time, the amount of bandwidth usage over time, and the number of people entering a building per day as measured by an electronic turnstile). As more data values are received over time, the monitoring service can expect newer data values of the data stream to follow one or more patterns, which may include trend patterns, seasonal patterns, and cyclical patterns.

However, if the latest new data value deviates significantly from historical data values, the server computer can use predictive modeling to determine whether the latest data value is (1) is likely to be anomalous (i.e., erroneous) and warrants further investigation or (2) is not likely to be anomalous but rather (a) is due to a new pattern that the server computer needs to adjust to or (b) is caused by one or more external events that are outside of the organization's control.

In some embodiments, to differentiate anomalous data values from non-anomalous ones in a data stream, when the server computer receives a new data value of the data stream, a server computer can select one or more models with periodicities that match the time interval that the new data value corresponds to. Upon selecting the models, the server computer can generate a score for each of the selected models. To generate a score for a model, the model can use historical data values of the data stream that match the model's periodicity (i.e., the model's sampling frequency) to generate a prediction value based on the matching historical data values. Upon determining the prediction value, the server computer can generate a score for the model based on the prediction value and the new data value.

Upon generating a score for each of the models, the server computer can generate a final score based on the scores. The server computer can determine a score threshold, e.g., based on the variance of the historical data values. Upon obtaining the final score and the score threshold, the server computer can determine whether the final score exceeds the score threshold. If the final score exceeds the score threshold, the new data value may likely be an anomaly that warrants further investigation. For an anomaly, the server computer may cause an alert to be generated and sent to the appropriate personnel, the alert indicating that the new data value is likely to be anomalous. If the final score does not exceed the score threshold, then the new data value is not likely to be anomalous.

In some cases, the server computer may be able to capture, from one or more determined anomalies, a new pattern that is being followed by the data values of the data stream. In this regard, the server computer may create a new special model based on the new pattern and add the new model to the set of models available for generating predictions.

These and other embodiments of the invention are described in detail below. For example, embodiments are directed to systems and computer readable media associated with methods described herein.

TERMS

Figure 1:
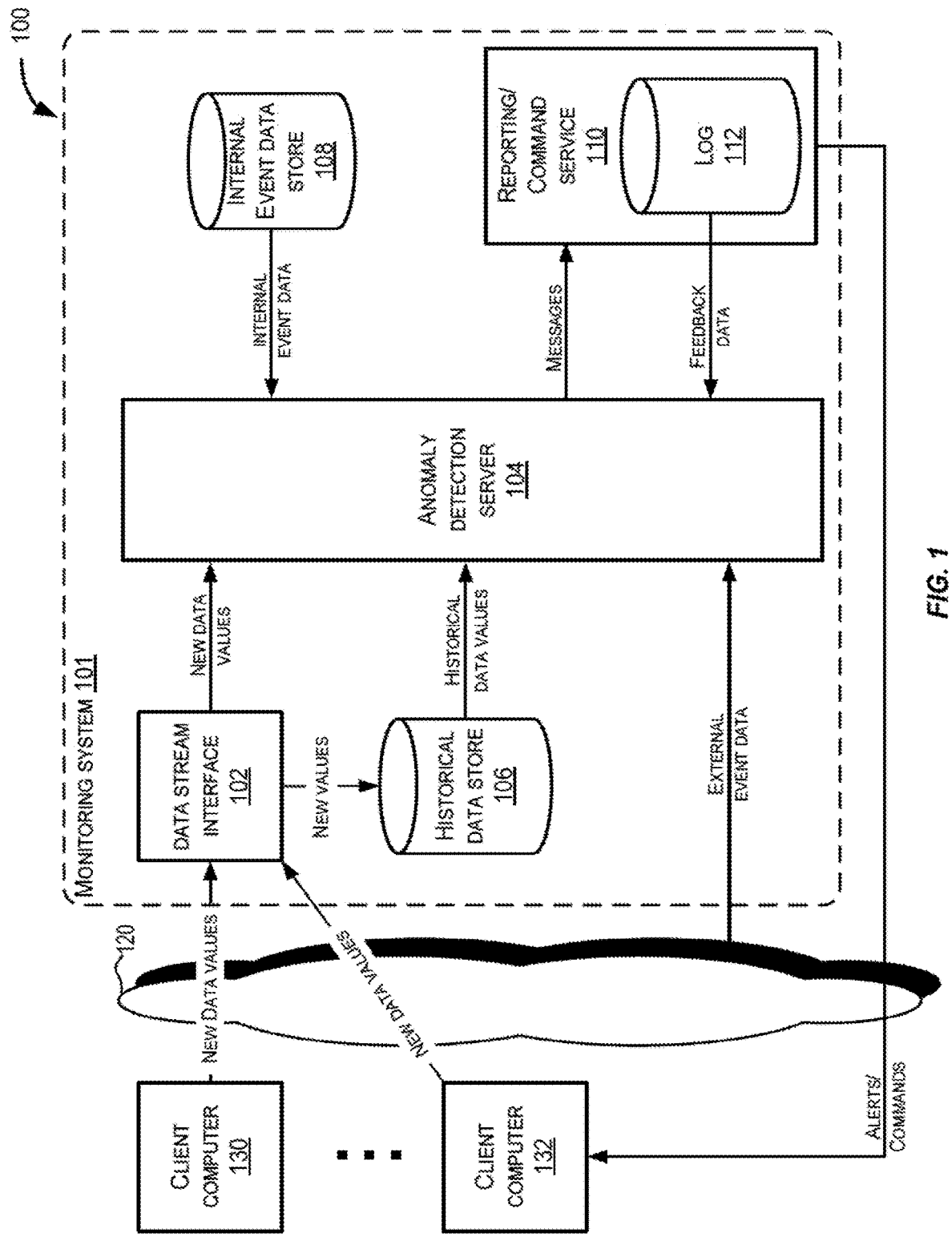
FIG. 1 illustrates a high-level block diagram of an environment in accordance with embodiments.

Prior to discussing embodiments of the invention, a further description of some terms may be helpful in understanding embodiments of the invention.

A "server computer" may include any suitable computer that can provide communications to other computers and receive communications from other computers. A server computer may include a computer or cluster of computers. For instance, a server computer can be a mainframe, a minicomputer cluster, or a group of servers functioning as a unit. In one example, a server computer may be a database server coupled to a Web server. A server computer may be coupled to a database and may include any hardware, software, other logic, or combination of the preceding for servicing the requests from one or more client computers. A server computer may comprise one or more computational apparatuses and may use any of a variety of computing structures, arrangements, and compilations for servicing the requests from one or more client computers. Data transfer and other communications between components such as computers may occur via any suitable wired or wireless network, such as the Internet or private networks.

A "processor" may include hardware within a server computer (or other computing device) that carries out instructions embodied as code in a computer-readable medium. An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

DETAILED DESCRIPTION

Embodiments can detect anomalous values in data streams using forecasting models. For example, an organization can run an anomaly detection framework that provides a service (i.e., a monitoring service). The monitoring service can periodically receive, as input, data values from a data stream. The data stream can comprise data values that are periodically provided by one or more client computers configured to be monitored by the monitoring service. Alternatively, the data stream can comprise data values that are being extracted and/or loaded from one or more data stores, data archives, and/or data files.

In some cases, the data values can correspond to one or more metrics that represent the client computers' operational status (e.g., the number of visits to a webpage per hour, the average hard drive temperature over time, the amount of bandwidth usage over time, the number of people entering a building per day, and the number of conversions per hour). As more data values are received over time, the monitoring service can expect newer data values of the data stream to follow one or more patterns, which may include trend patterns, seasonal patterns, and cyclical patterns. For instance, a first data stream that tracks a total number of visits to a website per day may provide data values that closely adhere to a positive linear trend because the website is growing in popularity at a consistent rate. A second data stream that tracks a total of visits at the same website per hour may provide data values that follow a path that has both a linear trend component and a seasonal component because the hourly visit totals decrease during night time hours but rebound during day time hours. A third data stream that tracks a total number of people entering a building between the hours of 12 AM and 4 AM each day, may provide data values that remain more or less constant over time because the number of people entering the building during these hours is generally zero.

However, if the latest new data value deviates significantly from historical data values, the detection framework can use predictive modeling to determine whether the latest data value is (1) is likely to be anomalous (i.e., erroneous) and warrants further investigation or (2) is not likely to be anomalous but rather (a) is due to a new pattern that the detection framework needs to adjust to or (b) is caused by one or more external events that are outside of the organization's control. For example, if the first data stream provides a daily total of visits that is many times higher than normal, the detection framework may determine that because a new online feature is being rolled out by the website, the unexpectedly high visit count is not likely to be an anomaly that warrants investigation (e.g., a software failure). As another example, if the third data stream reports a non-zero number of people entering the building, the detection framework may determine that because nightly maintenance is occurring at the building, the unexpected non-zero number is not likely to be an anomaly that warrants investigation (e.g., a burglary).

To differentiate anomalous data values from non-anomalous ones in a data stream, when the detection framework receives a new data value of the data stream, the detection framework selects one or more models with periodicities that match the time interval that the new data value corresponds to. For example, if the sampling frequency is once per day (e.g., a daily total of visits) and the new data value corresponds to the first Monday of the month, the detection framework may select a weekly model that corresponds to the Monday of each week (i.e., the Monday model) and a monthly model that corresponds to the first Monday of each month (i.e., the first monthly Monday model). Additionally, if the new data value corresponds to a day that is associated with a special event (e.g., Christmas Day), the detection framework may further select a special model that corresponds to that event (e.g., the Christmas model).

Upon selecting the models, the detection framework generates a score for each of the selected models. To generate a score for a model, the detection framework feeds to the model one or more historical data values of the data stream that match the model's periodicity (i.e., the model's sampling frequency) and generates a prediction value based on the model and the matching historical data values. For example, the detection framework may feed all past Monday values to the Monday model and all past values that correspond to a first Monday of a month to the first monthly Monday model. The detection framework may then use the model to predict a next data value (i.e., a prediction value) based on the historical data values fed to the model. Upon determining the prediction value, the detection framework generates a score for the model based on the prediction value and the new data value. In some embodiments, the score may be based on a difference between the prediction value and the new data value.

Upon generating a score for each of the models, the detection framework can generate a final score based on the scores. At some point, the detection framework can generate a score threshold based on the variance of the historical data values. Upon obtaining the final score and the score threshold, the detection framework determines whether the final score exceeds the score threshold. If the final score exceeds the score threshold, the new data value may likely be an anomaly that warrants further investigation. Hence, detection framework may cause an alert to be generated and sent to the appropriate personnel, the alert indicating that the new data value is likely to be anomalous. If the final score does not exceed the score threshold, then the new data value is not likely to be anomalous.

In some cases, the detection framework may be able to capture, from one or more determined anomalies, a new pattern that is being followed by the data values of the data stream. In this regard, the detection framework may create a new special model based on the new pattern and add the new model to the set of models available for generating predictions.

Hence, certain embodiments described here may enable the monitoring of a data streams that follow complicated and/or varying patterns rather than simple data streams that only change seasonally or linearly. In particular, the ability to select and combine models, where each model represents a different pattern being followed by the data stream, enables the detection framework to more accurately forecast new data values for data streams that are affected by complex combinations of different patterns. Additionally, the incorporation of internal event data and external event data into the detection framework's prediction modelling process further improves the detection framework's accuracy in a real world environment. Accordingly, the number of false positives produced by monitoring the data streams may be reduced.

Furthermore, certain embodiments may provide the ability to detect new patterns followed by the data stream or changes within the patterns followed by the data stream and incorporate new models into the system to account for the new patterns or the changed patterns. In doing so, such embodiments will be able to adapt to new patterns in a way that preserves it's accuracy despite circumstances that vary over time.

I. System for Detecting Anomalies in Data Streams

An exemplary system 100 for using predictive modeling to detect anomalies in data streams can be seen in FIG. 1. The system 100 includes a monitoring system 101, a communication network 120, and client computers 130-132. The monitoring system 101 includes a data stream interface 102, an anomaly detection server 104, an historical data store 106, an internal event data store 108, a reporting/command service 110, and a log 112. The monitoring system 101 may be operated by an organization (e.g., a company) for monitoring one or more data streams for anomalies, where the data streams are received from the client computers 130-132.

FIG. 1 depicts the client computers 130-132 as being directly or indirectly monitored by the monitoring system 101, where the client computers 130-132 each periodically send new data values (i.e., new data values) to the monitoring system 101 via communication network 120. To provide the new data values to the monitoring system 101, each of the client computers 130-132 upload the new data values via the data stream interface 102. In turn, the data stream interface 102 may forward the data values in order of receipt to the anomaly detection server 104 as one or more data streams. Accordingly, each data stream may correspond to a time series, where each time series may follow one or more patterns including trend patterns, seasonal patterns, and/or cyclical patterns. In some embodiments, a data stream may be sourced from previously recorded data being extracted, loaded and/or transformed from one or more data stores, data archives, and/or data files.

Each time the anomaly detection server 104 receives a new data value from the data stream interface 102, the anomaly detection server 104 may determine whether the new data value is anomalous in view of existing patterns that are followed by the historical data values of the data stream. If the anomaly detection server 104 determines that the new data value is anomalous, the anomaly detection server 104 may cause the reporting/command service 110 to generate and send out an alert.

The client computers 130-132 may correspond to server computers that are each communicatively coupled to the communication network 120 and are each configured to periodically transmit new data values to the monitoring system 101. In some embodiments, the client computers 130-132 may each be configured to format each new data value into a Hypertext Transfer Protocol (HTTP) request and transmit the HTTP requests to the monitoring system 101 over the communication network 120. The data values provided by the client computers 130-132 can be for various purposes and take various forms. In general, each value may represent a metric that is associated with a time interval that is unique within the data stream. For example, the data values provided by the client computers 130-132 may each correspond to a daily total of visits (e.g., electronic accesses by a user) for a particular day received by a particular client computer. Regardless of form, the client computers 130-132 may provide the new data values to the monitoring system 101 via the data stream interface 102 over the communication network 120.

The data stream interface 102 may correspond to one or more services, web interfaces, application programming interfaces (APIs), and/or other types of interfaces that can be accessed by client computers 130-132 to provide new data values over the communication network 120. In some embodiments, the data stream interface 102 may correspond to one or more Representational State Transfer (REST) APIs that can be invoked by the client computers 130-132 to upload the new data values to the monitoring system 101. The data stream interface 102 may be configured to periodically receive the new data values from the client computers 130-132 and forward each of the received data values to the anomaly detection server 104 as part of one or more data streams. In some embodiments, the data values received from all of the client computers 130-132 may be funneled into a single data stream. In other embodiments, a plurality of data streams may be provided by the data stream interface 102 to the anomaly detection server 104, where each of the plurality of data streams includes data values from a different client computer or a different group of client computers.

The data stream interface 102 may forward, to the anomaly detection server 104, each received value in the order the data values were received. In some embodiments, the data stream interface 102 may be implemented by one or more processes executing on one or more server computers that are communicatively coupled to the communication network 120 and to the anomaly detection server 104. Although FIG. 1 depicts the data stream interface 102 and the anomaly detection server 104 as separate components, this is not intended to be limiting. For instance, the data stream interface 102 may be incorporated into the anomaly detection server 104.

In some embodiments, data stream interface 102 may expose an input API and an output API that is accessible by clients (e.g., client computers 130-132) from across the communication network 120. A client may call the input API to submit a data stream for monitoring by the monitoring system 101. In particular, the input API may accept data values for the data stream and corresponding time intervals for each of the data values. The output API can accept, from a client, the number of future data values to predict for the data stream. For example, the client may use the output API to specify that the next three values of a data stream should be predicted.

The anomaly detection server 104 may be communicatively coupled to the data stream interface 102 so as to periodically receive values for one or more data streams. The anomaly detection server 104 may be configured to analyze each new data value received for each of the one or more data streams to determine whether the new data value is an anomaly using predictive modelling. In particular, when the anomaly detection server 104 receives, from the data stream interface 102, a new data value of a data stream that pertains to a particular time interval, the anomaly detection server 104 may feed historical data values of the data stream into one or more forecast models to generate one or more prediction values. The anomaly detection server 104 may then determine whether the new data value is an anomaly based on one or more comparisons between the new data value and the one or more prediction values. In generating the one or more prediction values and making the one or more comparisons, the anomaly detection server 104 may take into account internal event data obtained from internal event data store 108, external event data obtained from sources external to the organization via communication network 120, and feedback data obtained from the log 112. For example, if a difference in a prediction value and a data value corresponds to a detected event, the difference may not be identified as an anomaly. Or equivalently, the prediction value can be adjusted based on the event. If the new data value is determined to be anomalous, the anomaly detection server 104 may cause the reporting/command service 110 to generate and send out an alert and/or a command.

The anomaly detection server 104 may be implemented by one or more processes that execute on one or more server computers. The hardware and software components of the anomaly detection server 104, according to some embodiments, are discussed in further detail below with reference to FIGS. 2-6.

The anomaly detection server 104 may be communicatively coupled to the historical data store 106. The historical data store 106 may correspond to one or more databases, files, and/or data structures in memory that are configured to store historical data values of one or more data streams that are being received by the data stream interface 102. The data stream interface 102 may be configured to store received data values to the historical data store 106 as historical data values. Thus, when the anomaly detection server 104 attempts to predict a data value for a data stream, the anomaly detection server 104 may access the historical data store 106 for historical data values. Although FIG. 1 depicts the data stream interface 102 and the historical data store 106 as separate components, this is not intended to be limiting. For instance, the historical data store 106 may be incorporated into the data stream interface 102 or the anomaly detection server 104.

The anomaly detection server 104 may be communicatively coupled to the internal event data store 108. The internal event data store 108 may correspond to one or more data bases, files, and/or data structures in memory that are configured to store data of events that are occurring within the organization (i.e., internal events). For example, the internal event data store 108 may correspond to one or more, system logs, maintenance logs, and internal process monitors (e.g., internally maintained tools used to monitor internal processes) that store information about the state of software processes executing on server computers within the organization and/or maintenance logs that store information about the status of hardware within the organization. When the anomaly detection server 104 attempts to predict a data value for a data stream, the anomaly detection server 104 may access the internal event data store 108 for internal event data. Internal event data may be stored into the internal event data store 108 by one or more other server computers that are operated by the organization including any of the other elements depicted in FIG. 1. For example, when a hard drive failure occurs within the organization, data pertaining to the hard drive failure may be provided to the internal event data store 108 so that the anomaly detection server 104 may take the hard drive failure into account when generating a prediction value. In some embodiments, the internal event data store 108 may be incorporated into the anomaly detection server 104 or the historical data store 106.

The anomaly detection server 104 may be communicatively coupled to the communication network 120. The communication network 120 can be of various types and can include one or more communication networks. Examples of the communication networks 120-122 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols. In general, the communication network 120 may include any communication network or infrastructure that facilitates communications between computing devices.

While in operation, the anomaly detection server 104 may consider external event data retrieved from sources (e.g., weather reports, social media feeds, news sites, and/or Rich Site Summary feeds) that are external to the organization via communication network 120. For example, in the event of a major regional earthquake, various social media feeds, government sites, and other websites may provide data pertaining to the disaster. Data from these sources may be obtained by or provided to the anomaly detection server 104 so that the anomaly detection server 104 can take the disaster into account when generating prediction values. Although not shown in FIG. 1, in some embodiments, a separate component or service may be responsible for collecting external event data from external sources and providing the external event data to the anomaly detection server 104.

The anomaly detection server 104 may be communicatively coupled to the reporting/command service 110, which may be implemented by one or more processes executing on one or more server computers. The reporting/command service 110 may be configured to generate and send out alerts and/or commands on behalf of one or more clients including the anomaly detection server 104. Accordingly, when the anomaly detection server 104 determines that a value of a data stream is likely to be anomalous, the anomaly detection server 104 may generate a message comprising information about the anomaly and send the message to the reporting/command service 110. Upon receiving an message, the reporting/command service 110 persist the message in the log 112. The reporting/command service 110 may then generate one or more alerts containing the information and transmit the one or more alerts to appropriate personnel.

In some embodiments, the reporting/command service may display the one or more alerts through one or more graphical monitoring applications (e.g., Grafana).

Additionally, the reporting/command service 110 may generate one or more messages containing one or more commands from the anomaly detection server 104 (e.g., command messages) and transmit the command messages to one or more other computing devices (e.g., routers, other server computers, client computers including client computers 130-132), where the command messages cause the one or more other computing devices to perform one or more actions based on the anomaly. Examples of actions may include halting/starting/restarting one or more software processes and/or restarting the one or more other computing devices. For instance, if the anomaly suggests that more software processes (e.g., web server processes) are needed to handle high traffic load to a website, the command message may include commands to start additional software processes.

II. Anomaly Detection Server and Subsystems

Figure 2:
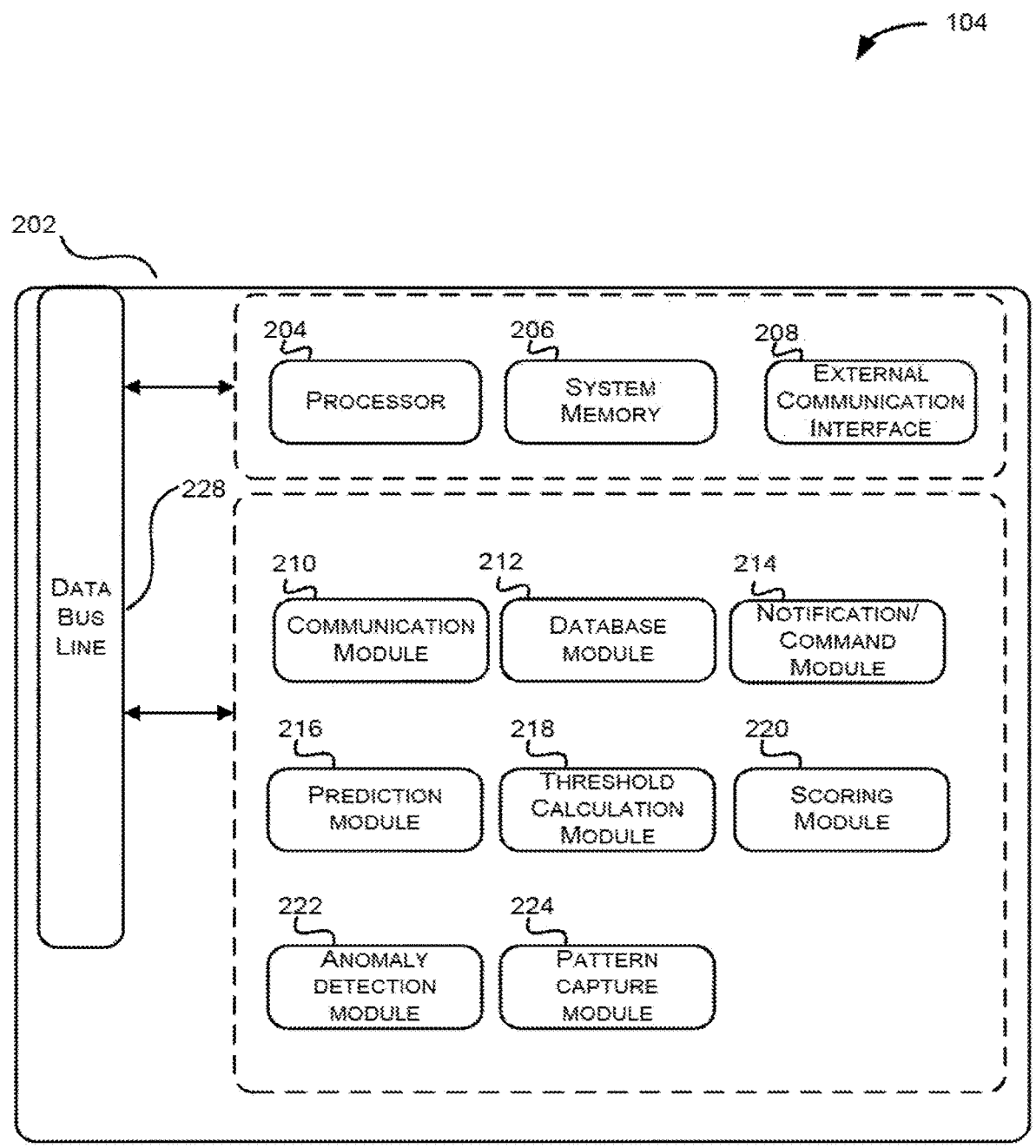
FIG. 2 illustrates a block diagram of an anomaly detection system in accordance with embodiments.
Figure 3:
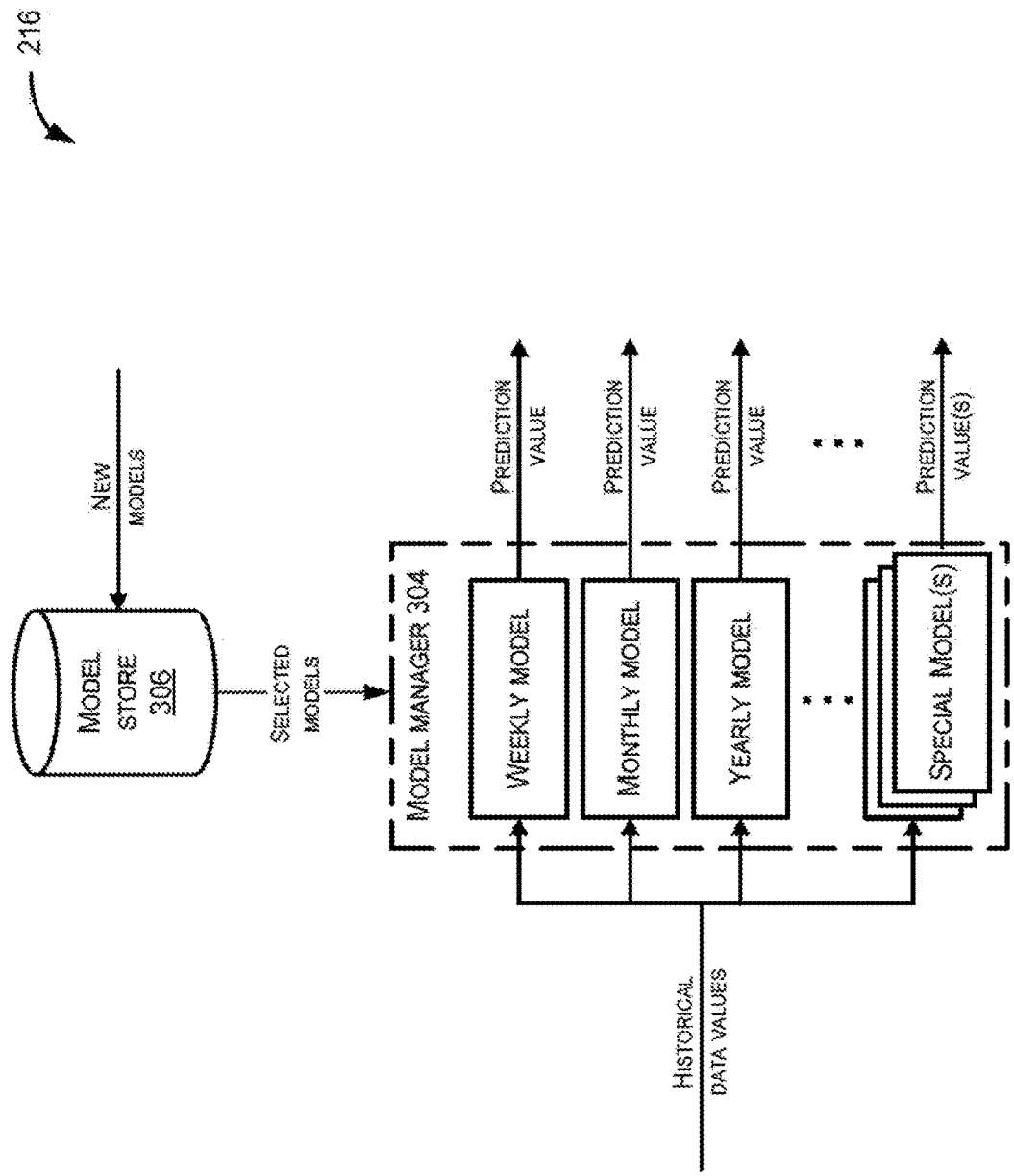
FIG. 3 illustrates a block diagram of a prediction module in accordance with embodiments.
Figure 4:
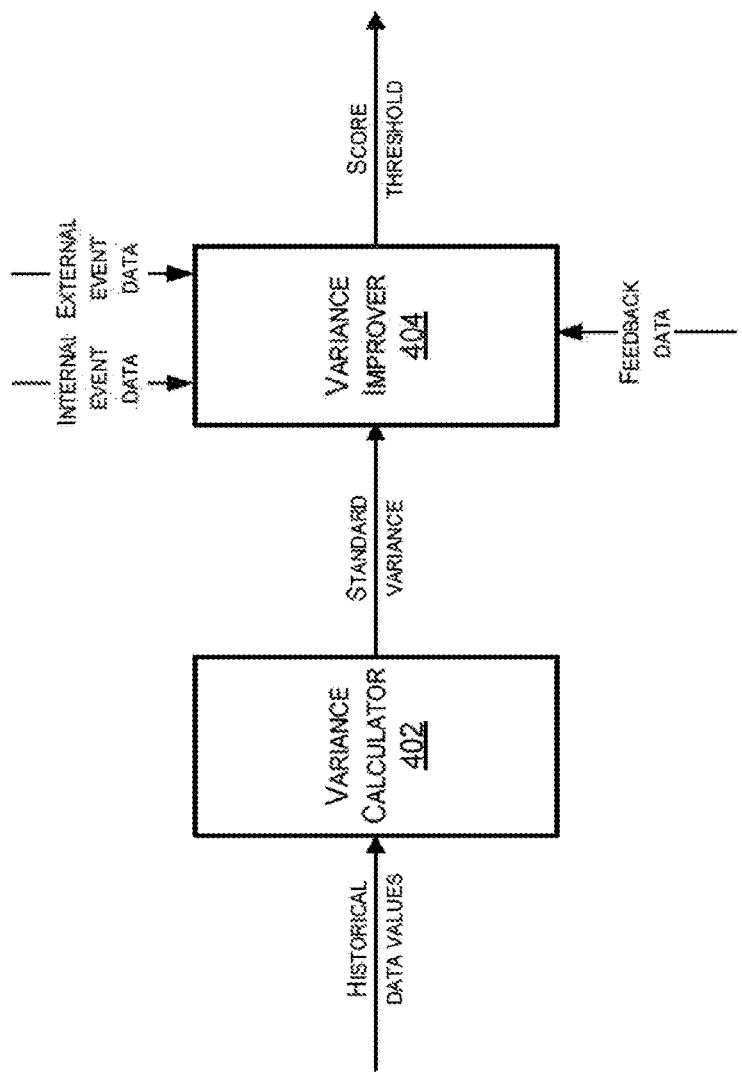
FIG. 4 illustrates a block diagram of a threshold calculation module in accordance with embodiments.
Figure 5:
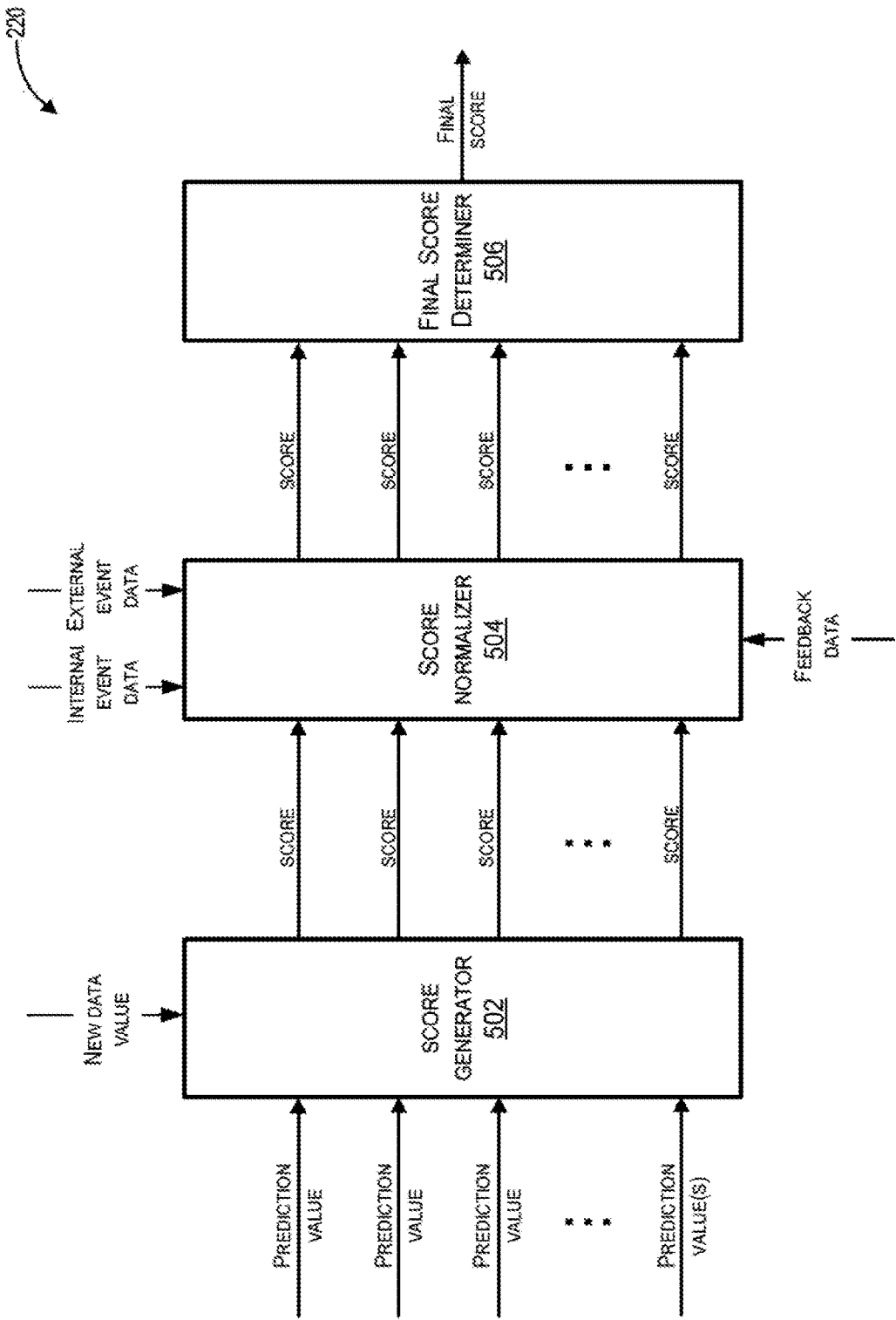
FIG. 5 illustrates a block diagram of a scoring module in accordance with embodiments.
Figure 6:
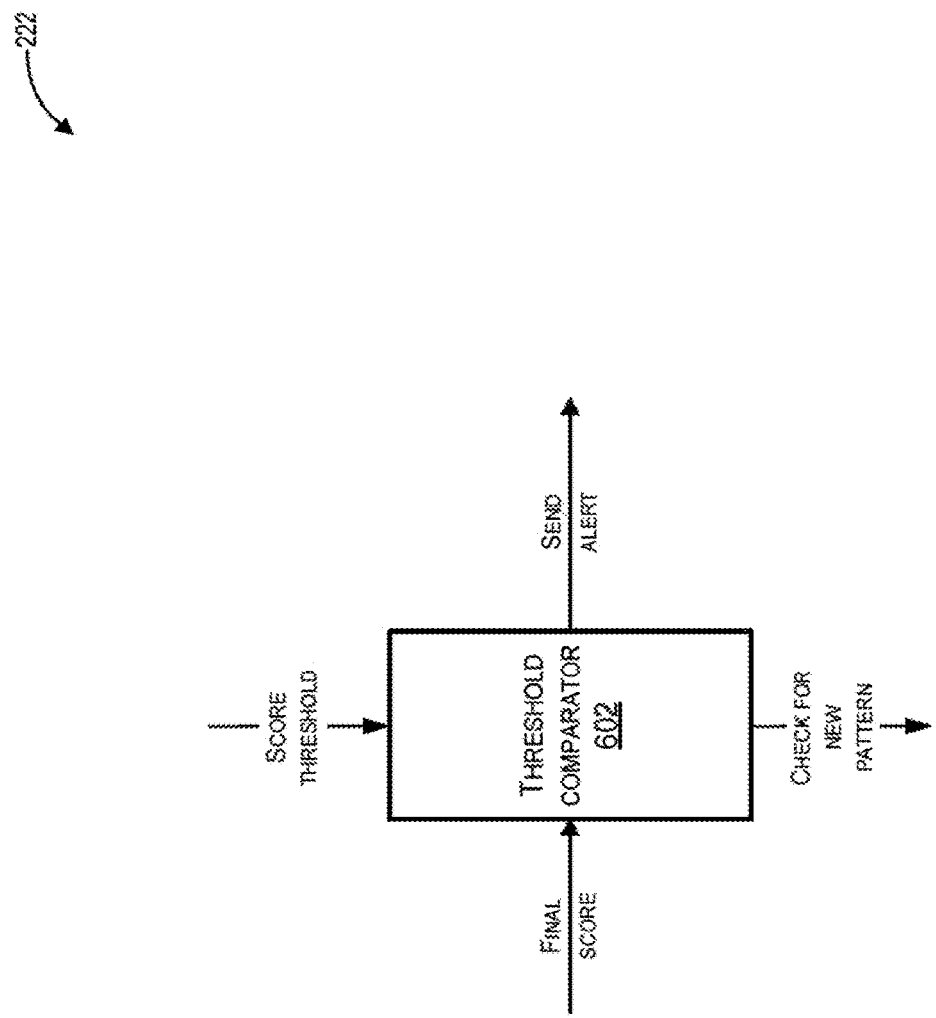
FIG. 6 illustrates a block diagram of an anomaly detection module in accordance with embodiments.

FIGS. 2, 3, 4, 5, and 6 show block diagrams illustrating anomaly detection server 104 and components thereof in various levels of detail. In particular, FIG. 2 illustrates a high level block diagram of the anomaly detection server 104 in accordance with embodiments. FIG. 3 illustrates a block diagram of a prediction module in accordance with embodiments. FIG. 4 illustrates a block diagram of a threshold calculation module in accordance with embodiments. FIG. 5 illustrates a block diagram of a scoring module in accordance with embodiments. FIG. 6 illustrates a block diagram of an anomaly detection module in accordance with embodiments.

A. Detection Server

FIG. 2 illustrates a block diagram of the anomaly detection server 104 including an exemplary server computer 202 in accordance with embodiments. The server computer 202 is illustrated as comprising a plurality of hardware and software modules (204-228). However, it should be appreciated that this is provided for illustration purposes only, and each of the modules and associated functionality may be provided and/or performed by the same or different components. That is, the server computer 202 may perform some of the relevant functions and steps described herein with reference to the anomaly detection server 104 through the use of any suitable combination of software instructions and/or hardware configurations. It should be noted that although FIG. 2 (and other systems described herein) illustrates all of the modules located on a single device, the disclosure is not meant to be so limited. Moreover, a system for implementing the functionality described herein may have additional components or less then all of these components. Additionally, some modules may be located on other devices such as a remote server or other local devices that are functionally connected to the server computer component(s). In some cases, the software modules may be located on a virtual machine or a container.

The server computer 202 is shown as comprising a processor 204, system memory 206 (which may comprise any combination of volatile and/or non-volatile memory such as, for example, buffer memory, RAM, DRAM, ROM, flash, or any other suitable memory device), and an external communication interface 208. Moreover, one or more of the modules 210-220 may be disposed within one or more of the components of the system memory 206, or may be disposed externally. As was noted above, the software and hardware modules shown in FIG. 2 (and other systems described herein) are provided for illustration purposes only, and the configurations are not intended to be limiting. The processor 204, system memory 206 and/or external communication interface 208 may be used in conjunction with any of the modules described below to provide a desired functionality. Some exemplary modules and related functionality may be as follows:

A communication module 210 may be configured or programmed to perform some or all of the functionality associated with receiving, sending, and generating electronic messages for transmission through the anomaly detection server 104 to or from any of the entities shown in FIG. 2. When an electronic message is received by the server computer 202 via the external communication interface 208, it may be passed to the communication module 210. The communication module 210 may identify and parse the relevant data based on a particular messaging protocol used in the anomaly detection server 104. As examples, the received information may comprise new data values of a data stream, historical data values of an internal event data, external event data and feedback data, and/or any other information that the anomaly detection server 104 may utilize in predicting values or detecting anomalies. The communication module 210 may then transmit any received information to an appropriate module within the server computer 202 (e.g., via a data bus line 228). The communication module 210 may also receive information from one or more of the modules in the server computer 202 and generate an electronic message in an appropriate data format in conformance with a transmission protocol used in the anomaly detection server 104 so that the message may be sent to one or more entities within system 100 (e.g., to the reporting/command service 110). The electronic message may then be passed to the external communication interface 208 for transmission. The electronic message may, for example, comprise a message (e.g., to be transmitted to the reporting/command service 110) or any other suitable electronic message used in the context of anomaly detection.

In embodiments where one or more data stores depicted in FIG. 1 correspond to databases (e.g., historical data store 106, internal event data store 108, and log 112), a database module 212 may be programmed or configured to perform some or all of the functionality associated with retrieving information from the databases. In this regard, the database module 212 may receive requests from one or more of the modules of the server computer 202 for information that may be stored in one or more of the databases. The database module 212 may then determine and query an appropriate database.

The database module 212 may also be programmed or configured to provide some or all of the functionality associated with maintaining and updating the databases (e.g., historical data store 106, log 112). In this regard, the database module 212 may receive information from one or more of the modules described herein. Such information may then be stored in the appropriate location in the databases using any suitable storage process. For example, in some embodiments, the anomaly detection server 104 may be responsible for storing new data values received from the data stream interface 102 into the historical data store 106. In such embodiments, the database module 212 may receive information comprising one or more new data values from the communication module 210. The database module 212 may then cause the information to be stored into a database that corresponds to the historical data store 106.

A notification/command module 214 may be programmed and/or configured to perform functionality associated with generating and transmitting messages to a reporting/command service (e.g., reporting/command service 110). If the scoring module 220 determines that a value for data stream is anomalous, the scoring module 220 may cause the notification/command module 214 to generate a message that encapsulates information about the anomaly. In some embodiments, the encapsulated information may include the data value, the associated prediction value predicted by the prediction module 216, the models selected for predicting the prediction value, the score based on the prediction value and the data value, the associated score threshold, internal events and external events that were considered, and other information that may be helpful for diagnosing the cause of the anomalous value. The notification/command module 214 may transmit the message to the reporting/command service 110.

A prediction module 216 may be programmed and/or configured to perform functionality associated with generating prediction values to compare with the data values of a data stream. More specifically, when a value for a data stream is received by the communication module 210 from the data stream interface 102, the prediction module 216 may be caused to generate one or more prediction values for the time interval that corresponds to the received value based on historical data values of the data stream and one or more selected models. The steps performed by the prediction module 216 for generating prediction values are discussed in further detail with respect to FIG. 3.

A threshold calculation module 218 may be programmed and/or configured to perform functionality associated with calculating a score threshold. More specifically, when a value for a data stream is received by the communication module 210 from the data stream interface 102, the threshold calculation module 218 may be caused to generate a score threshold for the data value based on the historical data values of the data stream. In some embodiments, a score threshold may not be generated for each value of a data stream that is received. Rather, a score threshold that was generated for an earlier value of a data stream may be re-used for one or more subsequent values of the data stream. The steps performed by the threshold calculation module 218 are discussed in further detail with respect to FIG. 4.

A scoring module 220 may be programmed and/or configured to perform functionality associated with generating a final score based on a value of a data stream and the prediction values associated with the data value. More specifically, when the prediction module 216 generates prediction values for a value of a data stream, the prediction module 216 may forward the data value and the prediction values to the scoring module 220. Upon receiving the data value and the prediction values, the scoring module 220 may generate a final score based on the data value and the prediction values. The steps performed by the scoring module 220 are discussed in further detail with respect to FIG. 5.

An anomaly detection module 222 may be programmed and/or configured to perform functionality associated with determining whether a value of a data stream is anomalous based on the data value's final score and the score threshold. In particular, upon receiving the score threshold from the threshold calculation module 218 and the data value's final score from the scoring module 220, the anomaly detection module 222 may determine whether the final score exceeds the score threshold. If the final score exceeds the score threshold, the data value is considered likely to be anomalous and the anomaly detection module 222 may cause an alert to be generated and sent out. The steps performed by the anomaly detection module 222 are discussed in further detail with respect to FIG. 6.

A pattern capture module 224 may be programmed and/or configured to perform functionality associated with detecting patterns within the data stream and creating new models to capture the detected patterns. In some situations, one or more anomalies that are detected by the anomaly detection module 222 may be indicative of a new pattern that is being followed by the data stream. For example, if the organization institutes a periodic maintenance schedule, where one or more servers within the organization are taken offline for maintenance, data values within the data stream that originated from the servers that are taken down may be anomalous. In this case, the pattern capture module 224 may recognize from the characteristics of the anomalies (e.g., the anomalies appear bi-monthly, the anomalies originate from the same servers, the anomalous values are always zero) and other information (e.g., internal event data point to servers being taken offline) that the anomalies correspond to a periodic event that occurs contemporaneously with the time intervals associated with the anomalies. The pattern capture module 224 may then create a new model whose periodicity matches the detected periodic event and store the new model into the prediction module 216. As a result, the anomaly detection server 104 is able to quickly adapt to new trends that are followed by the data stream.

In some embodiments, the anomaly detection server 104 may provide an interface that enables a human operator to manually add new models to the anomaly detection server 104.

B. Prediction Module

FIG. 3 illustrates a block diagram of the components comprised by the prediction module 216 in accordance with embodiments. The prediction module 216 is illustrated as comprising a plurality of subsystems (304-306). However, it should be appreciated that this is provided for illustration purposes only, and each of the sub-systems and associated functionality may be provided and/or performed by the same or different components.

1. Model Manager

Generally, a forecast model can be used to predict a next value in a data stream based on the historical data values of the data stream. In this regard, a model manager 304 may be programmed and/or configured to perform functionality associated with selecting forecast model(s) for a data stream and evaluating the models to generate the one or more prediction values. When the anomaly detection server 104 receives a value for a data stream, the model manager 304 may select one or more forecast models from the model store 306. For a particular data stream, the model manager 304 may have a number of models to choose from, e.g., certain models may be identified as being suitable to a particular stream. As an example, a model can be a Holt-Winters triple exponential forecasting model with a unique periodicity (i.e., a unique combination of a period length and period start). If the data stream contains values that each correspond to a day, examples of models that could be chosen may include a weekly model (i.e., a model with a weekly periodicity) for each day of the week, a monthly model (i.e., a model with a monthly periodicity) for each day of the month, and a yearly model (i.e., a model with a periodicity of 365 days) for each day of the year. In some embodiments, the model manager may further maintain special models that correspond to special events that occur periodically, examples of which may include holiday events, the end of fiscal quarters, and pay days.

In general, when a value of a data stream that corresponds to a particular time interval (e.g., a particular day of the year) is received by the anomaly detection server 104, the model manager 304 may select one or more models whose periodicities match the time interval. For example, if the anomaly detection server 104 receives a value of a data stream that corresponds to Tuesday, March 5, the model manager 304 may select the daily model, a weekly model that corresponds to the Tuesday of each week, a monthly model that corresponds to the fifth day of each month, and another monthly model that corresponds to the first Tuesday of each month. In another example, if the anomaly detection server 104 receives a value of a data stream that corresponds to a Christmas Day that takes place on a Sunday, the model manager 304 may select the daily model, a weekly model that corresponds to the Sunday of each week, a monthly model that corresponds to the $25^{th}$ day of each month, another monthly model that corresponds to the last Sunday of each month, and a special model that corresponds to the Christmas Day of each year.

For each of the one or more selected forecast models, a set of historical data values of the data stream that match the periodicity of the forecast model may be retrieved from the historical data store 106. As examples, historical data values that correspond to each day may be retrieved for the daily model, historical data values that correspond to each Tuesday may be retrieved for the weekly model that corresponds to the Tuesday of each week, and historical data values that correspond to each Christmas Day may be retrieved for the special model that corresponds to Christmas Day. Next, each matching set of historical data values are fed to their corresponding models.

To account for complex combinations of patterns that may be followed by the data stream, each of the selected models may correspond to a Holt-Winters triple exponential forecasting model. Because each data stream corresponds to a time series, a data stream may follow one or more patterns, examples of which may include trend patterns, seasonal patterns, and cyclical patterns. A trend pattern may represent a long-term increase or decrease in the data values of the data stream. Trend patterns may be linear or non-linear. Seasonal patterns may represent how the data values experiences regular and predictable changes that repeat over a period of time (i.e., the period of the seasonal pattern) that is generally less than a year (e.g., a day, a week, a month). In other words, the period of a seasonal pattern is generally fixed in length. A cyclical pattern represents rises and falls by the data values of the data stream that are not of a fixed period.

A component form representation of a Holt-Winters triple exponential forecasting model may include a forecast equation, a smoothing equation for a level component $\ell_t$ (i.e., the level smoothing equation, which evaluates to an estimate of the level/y-intercept of a regression line formed by the time series at time t), a smoothing equation for a trend component $b_t$ (i.e., the trend smoothing equation, which evaluates to an estimate of the trend/slope of the regression line formed by the time series at time t), and a smoothing equation for a seasonal component $s_t$ (i.e., the seasonal smoothing equation), and three smoothing parameters $\alpha$, $\beta^*$ and $\gamma$. The term m is used to denote the period of seasonality.

The forecast equation, the level smoothing equation, the trend smoothing equation, and the seasonal smoothing equation can correspond to the following equations, respectively:

$$\hat{y}_{t+h|t} = \ell_t + h b_t + s_{t-m+h_m^+}$$

$$\ell_t = \alpha(y_t - s_{t-m}) + (1-\alpha)(\ell_{t-1} + b_{t-1})$$

$$b_t = \beta^*(\ell_t - \ell_{t-1}) + (1-\beta^*)b_{t-1}$$

$$s_t = \gamma(y_t - \ell_{t-1} - b_{t-1}) + (1-\gamma)s_{t-m}$$

where $h_m^+ = \lfloor(h-1) \bmod m\rfloor + 1$, $0 \leq \alpha \leq 1$, $0 \leq \beta^* \leq 1$, $0 \leq \gamma \leq 1$, h is the number of time intervals ahead in the time series that the model is trying to forecast (e.g., one time interval ahead), and m is the number of periods within a year (e.g., for a monthly model, m=12). As can be seen above, the level smoothing equation represents a weighted sum of the seasonally adjusted observation ($y_t - s_{t-m}$) and the non-seasonal forecast ($\ell_{t-1} + b_{t-1}$) for time t. The trend smoothing equation represents a weighted sum of the estimated slope at time t based on $\ell_t - \ell_{t-1}$ and $b_{t-1}$, the estimate of the slope at t-1. The seasonal smoothing equation represents a weighted sum of the current seasonal index, ($y_t - \ell_{t-1} - b_{t-1}$), and the seasonal index of the same season last during the last cycle (e.g., during the previous year). In this regard, the smoothing parameters $\alpha$, $\beta^*$ and $\gamma$ may be manually or automatically chosen by the model manager 304. Further details about Holt-Winters triple exponential forecasting models can be found in *Time series Forecasting using Holt-Winters Exponential Smoothing*. Retrieved from https://labs.omniti.com/people/jesus/papers/holtwinters.pdf.

By evaluating the forecast equation of a model using the data value and the historical data values, the model manager 304 can obtain the prediction value specific to the model and the time interval of the data value. Upon obtaining a prediction value from each of the selected models, the one or more prediction values may be provided to the scoring module 220.

2. Model Store

The model store 306 may correspond to one or more databases, files, and/or data structures in memory that are configured to store the models, which may include one or more models and one or more special models for use by the model manager 304. The standard models may correspond to models with a periodicity/sampling frequency equal to a commonly used time unit (e.g., hour, day, week, or month). Examples of standard models may include, without limitation, a model that corresponds to each hour, a model that corresponds to the hours of 9 AM to 12 PM each day, a model that corresponds to each entire day, a model that corresponds to each Thursday of the week, a model that corresponds to each entire week, a model that corresponds to the $6^{th}$ day of each month, a model that corresponds to the second Friday of each month, a model that corresponds to each entire month, and a model that corresponds to the summer months (e.g., the months of June, July, and August) of each year.

Special models may correspond to models that are created in response to the pattern capture module 224 detecting a pattern within a data stream, where the pattern's frequency does not match a commonly used time unit. Examples of special models may include a model that corresponds to a holiday, a model that corresponds to periodic maintenance that performed on servers within the organization (e.g., where the maintenance is performed every 6 weeks), a model that corresponds to a periodic stress testing (e.g., simulated high-traffic conditions) that is performed against the servers within the organization (e.g., where the stress testing is performed every four months), a model that corresponds to each end of a fiscal quarter, a model that corresponds to each payday (e.g., where payday occurs bi-weekly), a model that corresponds to each start of the organization's winter holiday break, and other models that correspond to periodic events that affect the performance and/or operation of the servers within the organization. In this regard, when the pattern capture module 224 detects a pattern in the data stream and creates a new model to capture that pattern, the pattern capture module 224 may store the new model within the model store 306.

C. Threshold Calculation

FIG. 4 illustrates a block diagram of the components comprised by the threshold calculation module 218 in accordance with embodiments. The threshold calculation module 218 is illustrated as comprising a plurality of subsystems (402-404). However, it should be appreciated that this is provided for illustration purposes only, and each of the sub-systems and associated functionality may be provided and/or performed by the same or different components.

Although the data values of a data stream are expected to more or less adhere to a one or more patterns, a certain amount of fluctuation may be tolerated or even expected. In this regard, the threshold calculation module 218 may provide a score threshold that represents how much variance in the data values is tolerable. Accordingly, a value is not considered likely to be anomalous so long as the data value's final score falls within the score threshold.

A variance calculator 402 may be programmed and/or configured to perform functionality associated with determining a variance based on the historical data values of a data stream. The variance calculator 402 may calculate the variance (e.g., a standard deviation) of the historical data values of the data stream. As an example, the variance may be equal to the average of the squared differences of each of the historical data values from the mean of the historical data values. Thus, if the historical data values fluctuate wildly within the data stream, the variance may be larger. On the other hand, the variance may be smaller if the historical data values stay more or less constant.

In some embodiments, a variance improver 404 may be programmed and/or configured to perform functionality associated with improving the variance based on internal event data, external event data, and feedback data. When the variance improver 404 receives a variance that is calculated by the variance calculator 402, the variance improver 404 may retrieve internal event data from the internal event data store 108, external event data from various external sites and sources through the communication network 120, and feedback data from the log 112. The retrieved data may be used to adjust and/or improve the variance to obtain the score threshold.

In some embodiments, feedback data, which may correspond to historical alerts that were caused to be sent by the anomaly detection server 104, may be used to adjust the variance. For example, if the variance improver 404 determines from the historical alerts that alerts are sent too often, the variance improver 404 may increase the score threshold so that larger differences between the data value and the prediction values are tolerated by the anomaly detection server 104.

D. Determination of Scores

FIG. 5 illustrates a block diagram of the components comprised by the scoring module 220 in accordance with embodiments. The scoring module 220 is illustrated as comprising a plurality of subsystems (502-506). However, it should be appreciated that this is provided for illustration purposes only, and each of the sub-systems and associated functionality may be provided and/or performed by the same or different components.

A score generator 502 may be programmed and/or configured to perform functionality associated with generating a score for each selected forecast model that is associated with the new data value. Upon the receipt of the new data value, score generator 502 may obtain the data value from the communication module 210. Upon the generation of a prediction value for each of the selected models by the prediction module 216, the score generator 502 may obtain the prediction values from the prediction module. The score generator 502 then generates a score for each of the selected models based on the data value and the prediction value produced by the model. In particular generating a score based on a value and a prediction value may involve calculating a difference between the data value and the prediction value. In this regard, the higher the score, the more likely the score exceeds the score threshold and the more likely the data value is anomalous.

In some embodiments, a score normalizer 504 may be programmed and/or configured to perform functionality associated with normalizing scores associated with each selected forecast model that is associated with the new data value. In particular, the score normalizer 504 may obtain the scores generated for each of the selected models from the score generator 502. The score normalizer 504 may also retrieve internal event data from the internal event data store 108, external event data from various external sites and sources through the communication network 120, and feedback data from the log 112. The retrieved data may be used to adjust, filter and/or normalize the scores. For example, in embodiments where the final score is determined by calculating a weighted average of the scores, if the retrieved data suggests that the accuracy of a particular model is lower for the current prediction, a weight that is applied to the score produced by the particular model may be adjusted (e.g., lowered) to adjust the impact of the particular model on the final score.

In another example, feedback data, which may correspond to historical alerts that were sent by the anomaly detection server 104, may be used to normalize the scores. In this regard, if the score normalizer 504 determines from the historical alerts that alerts are sent too often, the score normalizer 504 may lower weights are applied to the scores to increase the chance that the final score will not exceed the score threshold.

A final score determiner 506 may be programmed and/or configured to perform functionality associated with generating a final score from one or more scores associated with each selected forecast model that is associated with the new data value. In particular, the final score determiner 506 may obtain one or more scores from score generator 502. The final score determiner 506 may then generate a final score based on the one or more scores. Generating the final score based on the one or more scores may be done in multiple ways. Examples may include selecting the lowest score out of the one or more scores, calculating a weighted average of the one or more scores, selecting the mode of the one or more scores, and selecting the highest score out of the one or more scores.

It should be noted that special models may be especially effective in embodiments that select the lowest score out of the one or more scores to obtain the final score. In such embodiments, if at least one of the selected models generates a prediction value that does not deviate significantly from the new data value, the new data value is not considered likely to be anomalous. For example, if the new data value corresponds to a time interval that is Christmas Day, the new data value may deviate significantly from all of the prediction values except for the prediction value generated by the special model that corresponds to all Christmas Days. As a result, the score produced for the special model may be chosen as the final score and the new data value may not be considered likely to be anomalous.

E. Detection of Anomaly

FIG. 6 illustrates a block diagram of the component(s) comprised by the anomaly detection module 222 in accordance with embodiments. The anomaly detection module 222 is illustrated as comprising the subsystem 602. However, it should be appreciated that this is provided for illustration purposes only, and each of the sub-systems and associated functionality may be provided and/or performed by the same or different components.

A threshold comparator 602 may be programmed and/or configured to perform functionality associated with determining whether a final score exceeds a score threshold. In particular, the threshold comparator 602 may obtain a final score from the scoring module 220 and a score threshold from the threshold calculation module 218. The threshold comparator 602 may then determine whether the data value is anomalous by determining whether the final score exceeds the score threshold. If the data value is determined to be anomalous, the threshold comparator may cause the notification/command module 214 to generate and send an message to the reporting/command service 110. In some embodiments, upon determining a likely anomaly, the threshold comparator 602 may send the anomalous data value to the pattern capture module 224. In turn, the pattern capture module 224 may determine whether the anomalous data value is an isolated event or related to a new pattern that is being followed by the data stream.

It should be noted, that because the accuracy of forecast models may be dependent upon the integrity of the historical data values, new data values that are determined to be anomalous may not be added to the historical data values. In some cases, new data values may be affected by internal events, i.e., non-periodic or unexpected events that occurred within the organization. For example, a database failure, a misconfiguration, a job failure, a system failure, a power outage, or a network connection failure may cause one or more new data values to have a value of zero. In some cases, new data values may be affected by external events, i.e., non-periodic or unexpected events that are external to the organization. For example, a market crash, a weather-related event, or a natural disaster may cause one or more new data values to be unexpectedly low or unexpectedly high.

To keep anomalous data values from affecting the historical data values, whenever the anomaly detection server 104 determines that a new data value is anomalous, the anomaly detection server 104 may cause a prediction value that corresponds to the new data value to be added to the historical data values in place of the new data value. For example, if the daily visit total of the latest day for a web server is zero due to a hard drive failure, the predicted daily visit total for the latest day will be added to the historical data values in place of the daily visit total.

III. Detecting Anomalies in a Data Stream

Figure 7:
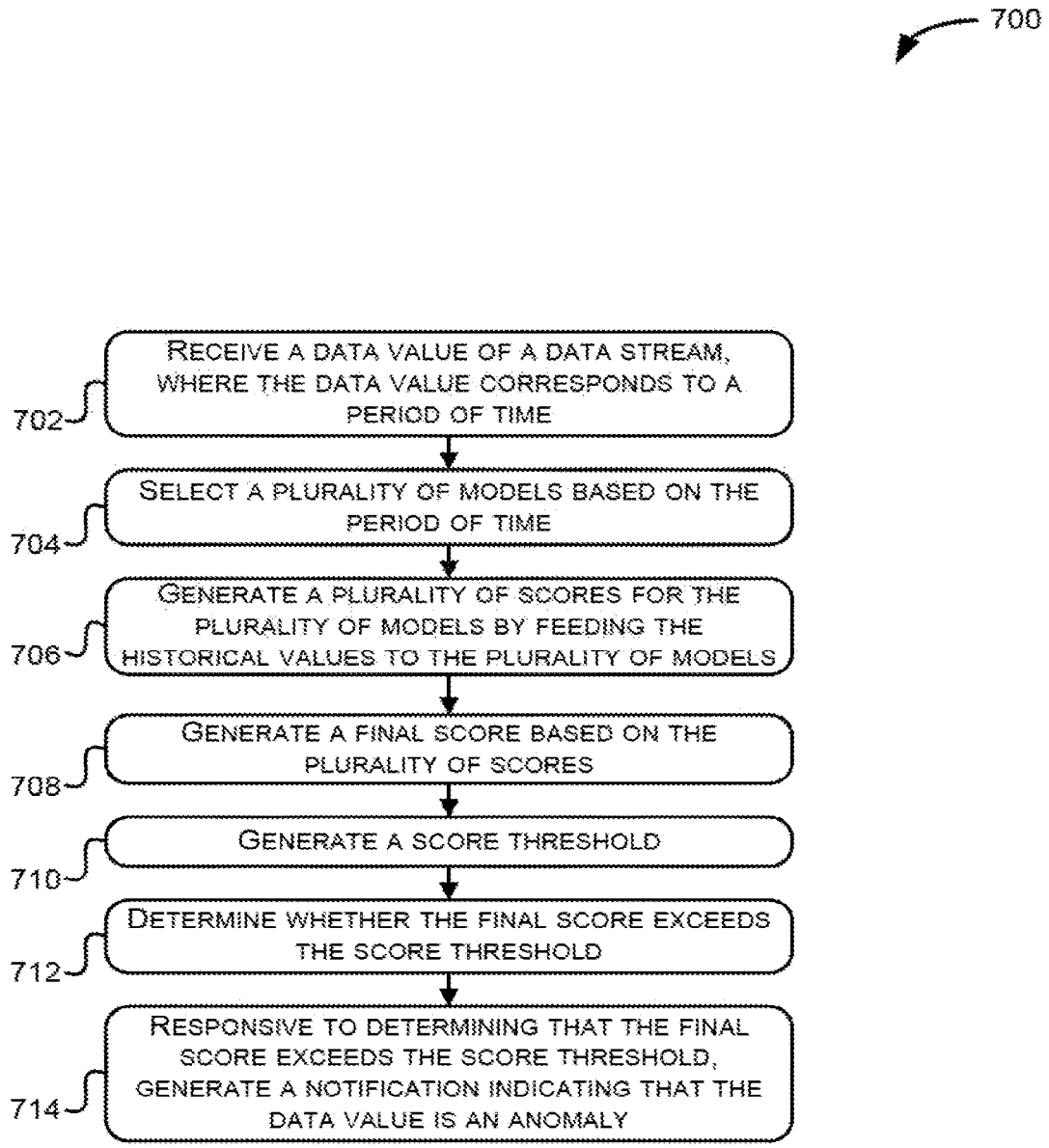
FIG. 7 illustrates a flowchart showing operations for detecting anomalies in a data stream in accordance with embodiments.

FIG. 7 illustrates a flowchart illustrating an exemplary method 700 for detecting anomalies in a data stream in accordance with embodiments. The steps of method 700 may be performed by the anomaly detection server 104.

At step 702, an anomaly detection server receives a new data value (i.e., a data value) of a data stream, where the data stream provides a series of data values including the data value and one or more past data values (i.e., historical data values). In this regard, the data value may correspond to the current time interval and each of the historical data values may correspond to a past time interval (i.e., a historical time interval). For example, each day, the anomaly detection server may be configured to receive from a web server, a daily total of visits to a website that is hosted by the web server. Accordingly, the historical data values may correspond to all of the daily visit totals that the web server sent to the anomaly detection server in the past, where each of the historical data values corresponds to a particular day in the past. The new data value that was just received in the data stream may correspond to the latest daily visit total that corresponds to the current time interval, which is the current day. In another example, each day, the anomaly detection server may be configured to receive from a server associated with a merchant, an amount of revenue earned by the merchant on that day (i.e., a daily revenue total). Accordingly, the historical data values may correspond to all of the daily revenue totals that the merchant server sent to the anomaly detection server in the past. The new data value that was just received in the data stream may correspond to the amount of revenue earned by the merchant over the most recent day.

At step 704, the anomaly detection server selects a plurality of models from a model store (e.g., model store 306) based on the time interval that the data value corresponds to. It should be noted that each model of the selected plurality of models may have a different (i.e., unique) periodicity. For example, if the current time interval corresponds to the second Tuesday of February, the anomaly detection server selects models whose periodicity matches that of the second Tuesday of February. Accordingly, the anomaly detection server may select a yearly model that corresponds to each day of the year, a weekly model that corresponds to the Tuesday of each week, a first monthly model that corresponds to the second Tuesday of each month, and a second monthly model that corresponds to the $14^{th}$ day of each month.

At step 706, the anomaly detection server generates a plurality of scores for the plurality of selected models by feeding the historical data values to each of the models. In particular, for each of the plurality of models, the anomaly detection server may feed, to the model, historical data values that match the periodicity of the model. For example, the yearly model may receive all daily total visits for each day of the year, the weekly model may receive the daily total visits for all Tuesdays, the first monthly model may receive the daily total visits for all second Tuesdays of the month, and the second monthly model may receive the daily total visits for all $14^{th}$ days of the month.

Next, for each of the plurality of models, the anomaly detection server may generate a prediction value from the model and then generate a score for the model based on the prediction value and the data value. For example, the anomaly detection server may generate four different predictions of the daily visit total for the current day, one prediction using the yearly model, another prediction using the weekly model, another prediction using the first monthly model, and another prediction using the second monthly model. The anomaly detection server may then compare each of the four predictions with the latest daily visit total to generate four different scores. In particular, each score may correspond to a difference between the latest daily visit total and one of the predicted daily visit totals.

At step 708, the anomaly detection server generates a final score based on the plurality of scores. For example, the anomaly detection server may select the lowest score as the final score. In this regard, so long as at least one of the models makes a close prediction, the latest daily visit total will not be found to be anomalous. On the other hand, if the latest daily visit total bucks the predictions of all of the models, then the latest daily visit total will be found to be anomalous.

At step 710, the anomaly detection server generates a score threshold. In this regard, the anomaly detection server may calculate the variance of at least a subset of the historical data values. The anomaly detection server may then adjust the variance based on one or more internal events, one or more external events, and one or more historical alerts and other feedback data to obtain the score threshold. For example, if the number of visits to the website fluctuates significantly from day to day, the score threshold may be larger. On the other hand, if the number of visits to the website stays more or less constant from day to day, the score threshold may be narrower.

At step 712, the anomaly detection server determines whether the final score exceeds the score threshold. For example, if the final score generated based on the latest daily visit total exceeds the score threshold generated in step 710, the latest daily visit total is likely to be anomalous and the organization may find it worthwhile to investigate the cause of the likely anomaly.

At step 714, in response to determining that the final score exceeds the score threshold, the anomaly detection server generates a notification (i.e., an alert) indicating that the data value is an anomaly. The alert may sent to appropriate personnel within the organization, which may cause the personnel to investigate the anomaly. For example, if the latest daily revenue total seems to be anomalous based on a final score exceeding a score threshold, an audit process may be started with respect to the merchant.

In some embodiments, the anomaly detection server may attempt to determine whether the anomaly is part of a new pattern that is being followed by the data stream. If the a new pattern is detected, the anomaly detection server may create a new special model that captures the new pattern and add it to the set of patterns that can be used to generate prediction values for future data values. For example, in response to determining that the latest daily visit total is anomalous, the anomaly detection server may attempt to determine whether this anomaly is actually part of a larger pattern that is affecting the daily number of visits to the website. In this regard, the anomaly detection server may determine that a past daily visit total that corresponds to the $14^{th}$ day of February of the previous year was also found to be anomalous. Eventually, the anomaly detection server may determine a previously undetected annual pattern that causes site traffic to surge every February $14^{th}$. As a result, the anomaly detection server may generate a special model with an annual periodicity that corresponds the February $14^{th}$ of each year and add the special model to the model store.

IV. Computer Apparatus

The various participants and elements described herein with reference to FIGS. 1-7 may operate one or more computer apparatuses to facilitate the functions described herein. Any of the elements in FIGS. 1-7, including any servers or databases, may use any suitable number of subsystems to facilitate the functions described herein.

Examples of such subsystems or components are interconnected via a system bus. Additional subsystems such as a printer, keyboard, fixed disk (or other memory comprising computer readable media), monitor, which is coupled to a display adapter, and others are shown. Peripherals and input/output (I/O) devices, which couple to I/O controller (which can be a processor or other suitable controller), can be connected to the computer system by any number of means known in the art, such as a serial port. For instance, serial port or an external interface can be used to connect computer apparatus to a wide area network such as the Internet, a mouse input device, or a scanner. The interconnection via system bus allows a central processor to communicate with each subsystem and to control the execution of instructions from a system memory or fixed disk, as well as the exchange of information between subsystems. System memory and/or fixed disk may embody a computer readable medium.

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, by a server computer, a data value of a data stream that is associated with one or more client computers, the data stream providing a series of data values over time, the series of data values comprising the data value and one or more historical data values that were received in the data stream prior to the data value, wherein the data value corresponds to a time interval and each of the one or more historical data values corresponds to a historical time interval;

selecting, by the server computer, a plurality of models based on the time interval associated with the data value, wherein each of the plurality of models has a different periodicity;

predicting, by the server computer, a plurality of prediction values for the plurality of models;

generating, by the server computer, a final score based on the plurality of prediction values;

generating, by the server computer, a score threshold based on the one or more historical data values, wherein generating the score threshold comprises:

calculating the score threshold based on a variance of at least a subset of the one or more historical data values;

detecting, by the server computer, one or more internal events; and adjusting the score threshold based on the one or more internal events; and responsive to determining that the final score exceeds the score threshold, transmitting, by the server computer, a notification that indicates that the data value is an anomaly to a computing device;

wherein the notification comprises a command that causes the computing device to perform one or more actions based on the anomaly;

wherein the one or more actions comprises: halting or starting one or more software processes; or halting or starting the computing device.

2. The method of claim 1, wherein the plurality of models comprises:
a first model with a daily periodicity;
a second model with a weekly periodicity; or
a third model with a monthly periodicity.

3. The method of claim 1, wherein the score threshold is adjusted based on one or more external events or one or more historical alerts.

4. The method of claim 3, wherein the score threshold is adjusted based on a frequency of the one or more historical alerts.

5. The method of claim 1, wherein for each model of the plurality of models, the server computer predicts a prediction value based on the model, and by feeding, to the model, one or more matching historical data values that match a periodicity of the model.

6. The method of claim 5, wherein predicting the prediction value based on the model further comprises:
estimating, based on the one or more matching historical data values, a level that corresponds to the time interval; and
estimating, based on the one or more matching historical data values, a trend that corresponds to the time interval.

7. The method of claim 6, further comprising:
generating the prediction value based on the level and the trend.

8. The method of claim 1, further comprising:
determining a periodic event that occurs contemporaneously with the time interval that caused the data value to be anomalous;
generating a new model based on the periodic event; and
adding the new model to the plurality of models.

9. The method of claim 8, wherein the periodic event affects how one or more client computers perform while the periodic event is occurring.

10. A server computer comprising:
a processor; and
a computer-readable medium coupled to the processor, the computer-readable medium including code executable by the processor for performing:
receiving a data value of a data stream that is associated with one or more client computers, the data stream providing a series of data values over time, the series of data values comprising the data value and one or more historical data values that were received in the data stream prior to the data value, wherein the data value corresponds to a time interval and each of the one or more historical data values corresponds to a historical time interval;
selecting a plurality of models based on the time interval associated with the data value, wherein each of the plurality of models has a different periodicity;
predicting a plurality of prediction values for the plurality of models;
generating a final score based on the plurality of prediction values;
generating a score threshold based on the one or more historical data values, wherein generating the score threshold comprises:
calculating the score threshold based on a variance of at least a subset of the one or more historical data values;
detecting, by the server computer, one or more internal events; and
adjusting the score threshold based on the one or more internal events; and
responsive to determining that the final score exceeds the score threshold, transmitting, by the server computer, a notification that indicates that the data value is an anomaly to a computing device;
wherein the notification comprises a command that causes the computing device to perform one or more actions based on the anomaly;
wherein the one or more actions comprises: halting or starting one or more software processes; or halting or starting the computing device.

11. The server computer of claim 10, wherein the plurality of models comprises:
a first model with a daily periodicity;
a second model with a weekly periodicity; or
a third model with a monthly periodicity.

12. The server computer of claim 10, wherein the score threshold is adjusted based on one or more external events or one or more historical alerts.

13. The server computer of claim 12, wherein the score threshold is adjusted based on a frequency of the one or more historical alerts.

14. The server computer of claim 10, wherein the computer-readable medium including code executable by the processor further performs:
for each model of the plurality of models, predict a prediction value based on the model, and by feeding, to the model, one or more matching historical data values that match a periodicity of the model.

15. The server computer of claim 14, wherein the computer-readable medium including code executable by the processor further performs:
estimating, based on the one or more matching historical data values, a level that corresponds to the time interval; and estimating, based on the one or more matching historical data values, a trend that corresponds to the time interval.

16. A non-transitory computer-readable storage medium including code executable by one or more processors for performing:

receiving, by a server computer, a data value of a data stream that is associated with one or more client computers, the data stream providing a series of data values over time, the series of data values comprising the data value and one or more historical data values that were received in the data stream prior to the data value, wherein the data value corresponds to a time interval and each of the one or more historical data values corresponds to a historical time interval;

selecting, by the server computer, a plurality of models based on the time interval associated with the data value, wherein each of the plurality of models has a different periodicity;

predicting, by the server computer, a plurality of prediction values for the plurality of models;

generating, by the server computer, a final score based on the plurality of prediction values;

generating, by the server computer, a score threshold based on the one or more historical data values, wherein generating the score threshold comprises:

calculating the score threshold based on a variance of at least a subset of the one or more historical data values;

detecting, by the server computer, one or more internal events; and adjusting the score threshold based on the one or more internal events; and responsive to determining that the final score exceeds the score threshold, transmitting, by the server computer, a notification that indicates that the data value is an anomaly to a computing device;

wherein the notification comprises a command that causes the computing device to perform one or more actions based on the anomaly;

wherein the one or more actions comprises: halting or starting one or more software processes; or halting or starting the computing device.

* * * * *